(12) United States Patent
Stecher (10) Patent No.: US 7,793,070 B2
(45) Date of Patent: Sep. 7, 2010

(54) PROCESSING SYSTEM IMPLEMENTING MULTIPLE PAGE SIZE MEMORY ORGANIZATION WITH MULTIPLE TRANSLATION LOOKASIDE BUFFERS HAVING DIFFERING CHARACTERISTICS

(75) Inventor: Brian Stecher, Kanata (CA)

(73) Assignee: QNX Software Systems GmbH & Co. KG, Hannover (DE)

( * ) Notice: Subject to any disclaimer, the term of this patent is extended or adjusted under 35 U.S.C. 154(b) by 370 days.

(21) Appl. No.: 11/776,970

(22) Filed: Jul. 12, 2007

(65) Prior Publication Data
US 2009/0019254 A1    Jan. 15, 2009

(51) Int. Cl.
*G06F 12/08* (2006.01)

(52) U.S. Cl. ............... 711/207; 711/170; 711/203

(58) Field of Classification Search ................ 711/203, 711/207, 170
See application file for complete search history.

(56) References Cited

U.S. PATENT DOCUMENTS

| | | | |
|---|---|---|---|
| 5,752,275 A | 5/1998 | Hammond | |
| 5,918,250 A | 6/1999 | Hammond | |
| 6,378,059 B1 | 4/2002 | Miyoshi | |
| 2002/0169936 A1 * | 11/2002 | Murphy | 711/205 |
| 2004/0215918 A1 | 10/2004 | Jacobs et al. | |
| 2008/0104362 A1 | 5/2008 | Buros et al. | |

FOREIGN PATENT DOCUMENTS

WO    WO 2006/106428 A2    10/2006

* cited by examiner

*Primary Examiner*—Pierre-Michel Bataille
(74) *Attorney, Agent, or Firm*—Brinks Hofer Gilson & Lione (57) ABSTRACT

A processing system includes memory management software responsive to a translation lookaside buffer miss. The memory management software updates translation lookaside buffer information based on one or more missed virtual addresses. Entries of a first translation lookaside buffer are updated by the memory management software with information corresponding to the missed virtual addresses if memory page size information for the missed virtual addresses meet a first criterion. Entries of a second translation lookaside buffer are updated by the memory management software with information corresponding to the missed virtual addresses if memory page size information for the missed virtual addresses meet a second criterion. The first and second criterion may correspond to first and second memory page sizes supported by the respective translation lookaside buffers.

17 Claims, 8 Drawing Sheets

PROCESSING SYSTEM IMPLEMENTING MULTIPLE PAGE SIZE MEMORY ORGANIZATION WITH MULTIPLE TRANSLATION LOOKASIDE BUFFERS HAVING DIFFERING CHARACTERISTICS

BACKGROUND OF THE INVENTION

1. Technical Field

The present invention relates to memory management in a processing system and, more particularly, to a processing system implementing multiple page size memory organization with multiple translation lookaside buffers having differing characteristics.

2. Related Art

There are a variety of different manners in which the memory of a processing system may be organized. One such manner is through the use of virtual memory. Virtual memory allows software to run in a memory address space in which the size and addressing of the memory space is not tied strictly to the physical memory of the processing system. In virtual memory systems, the operating system maps virtual memory to physical memory. The operating system uses this mapping to detect when an address is required that does not currently relate to main memory so that the requested data can be accessed.

Virtual memory may be implemented through paging. When the processing system uses paging, the low order bits of the virtual address are preserved and used directly as the low order bits of the actual physical address. In contrast, the high order bits may be treated as a key or index to one or more address translation tables that correspond to a range of consecutive physical addresses. The memory referenced by such a range may be called a page. Page sizes may range in size, for example, from 512 bytes through 8 megabytes.

The mappings between virtual memory and physical memory may be stored in page table entries of a page table array. These page table entries may be used by the operating system to execute and virtual address to physical address translations. The processing system also may include a translation lookaside buffer (TLB) to enhance the efficiency with which virtual memory addresses are translated to the corresponding physical addresses. The TLB is a cache that may have a fixed number of entries containing parts of various page table entries to improve the speed of the translation of a virtual address to its corresponding physical address. A TLB may include a content-addressable memory in which the search key is the virtual address and the search result is the physical address and access permissions. If the search of the TLB yields a match, the translation is known very quickly, and the physical address is used to access memory. If the virtual address is not in the TLB, the translation proceeds via the page table, which may take longer to complete.

The page size of the virtual/physical address space often may be fixed and/or difficult to dynamically change. Nevertheless, the page size(s) used in the page table entries and the TLB entries may have an impact on the performance of the system memory. Smaller page sizes may be advantageous when high granularity control of the memory access permissions is required. Likewise, small page sizes may be advantageous when applications only require small portions of the virtual memory space for their operation. Large page sizes, however, may be advantageous when used in connection with a TLB since TLB misses are less likely to occur when the virtual memory space is organized into large pages.

Many systems that employ multiple page sizes do so in a static manner. The versatility of such systems may be limited. Other systems implement multiple page sizes dynamically using hardware. Multiple TLBs also may be used with different characteristics associated with each page size. However, the manner in which the multiple page sizes may be realized is restricted to the manner in which it is implemented in the hardware and can add a significant amount of cost to the system. Therefore, a need exists for an improved system that can implement variable page sizes.

SUMMARY

A processing system includes memory management software responsive to a translation lookaside buffer miss. The memory management software updates translation lookaside buffer information based on one or more missed virtual addresses. Entries of a first translation lookaside buffer are updated by the memory management software with information corresponding to the missed virtual addresses if memory page size information for the missed virtual addresses meet a first criterion. Entries of a second translation lookaside buffer are updated by the memory management software with information corresponding to the missed virtual addresses if memory page size information for the missed virtual addresses meet a second criterion. The first and second criterion may correspond to first and second memory page sizes supported by the respective translation lookaside buffers.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
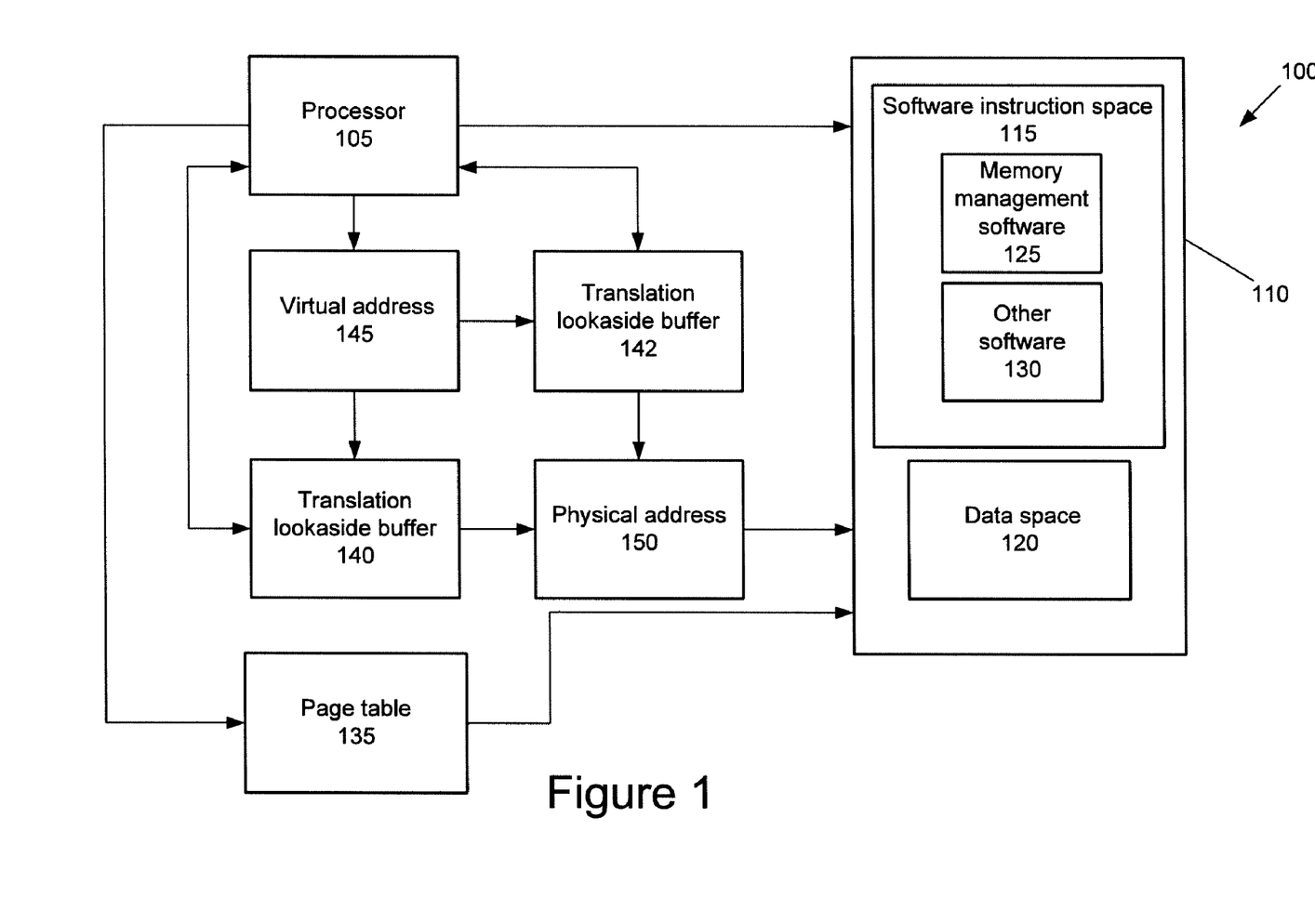
FIG. 1 is a block diagram of an exemplary processing system.

FIG. 1 is a block diagram of a processing system 100 that may implement variable page size memory organization. The processing system 100 includes a processor 105 that accesses physical memory 110. Processor 105 is shown as a single processor. However, system 100 may be implemented as a symmetric multiprocessor system, a parallel processing system, or other processing architecture.

Physical memory 110 may include software instruction space 115 and data space 120. The software instruction space 115 may include memory management software 125 and other software code 130. The memory management software 125 may be executable by processor 105 to manage the memory space of the processing system 100. In FIG. 1, the memory management software 125 manages the memory of system 100 using virtual memory addressing.

In FIG. 1, the processing system 100 employs at least one page table 135 that provides a mapping between virtual memory addresses and corresponding physical addresses of physical memory space 110. Multiple page tables may also be employed and managed. Page table 135 may reside in the physical memory space 110, in a memory management unit, and/or in other forms of physical memory space.

Processing system 100 uses multiple translation lookaside buffers 140 and 142. Each translation lookaside buffer (TLB) 140 and 142 is adapted to cache page table entries that have differing characteristics. TLB 140 is adapted to cache information for selected page table entries having a first memory page size. TLB 142 is adapted to cache information for selected page table entries having a second memory page size. In FIG. 1, the first and second memory page sizes differ from one another. TLB 142 may be used to cache page table entries that have a memory page size that is larger than the page table entries that are cached in TLB 140. By employing separate TLBs for different page sizes, the architecture for each TLB may be simplified. Although the processing system 100 shown in FIG. 1 utilizes two TLBs 140 and 142 for simplification, the processing system 100 and corresponding processing operations may be extended to the use of additional TLBs.

The TLB caches 140 and 142 provide faster translations between a virtual address provided by processor 105 at 145 and a physical address provided at 150 than would occur with a walk-through of page table 135. The physical address 150, in turn, is used to access the corresponding entries of physical memory space 110. The TLBs 140 and 142 may be part of the processor 105, part of a memory management unit, or may be part of a separate hardware module.

Figure 2:
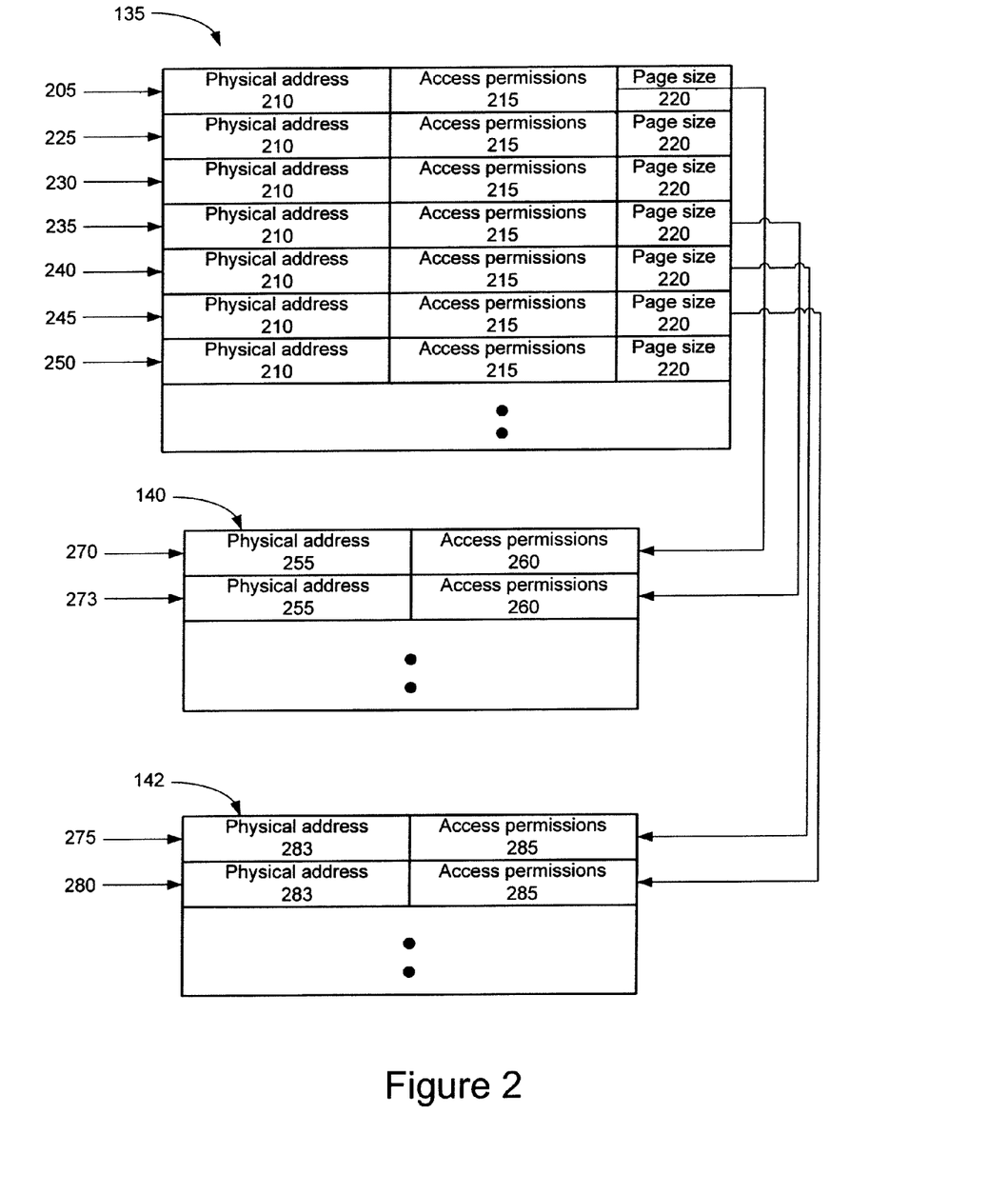
FIG. 2 illustrates page table and TLB structures that may be used in the processing system shown in FIG. 1.

FIG. 2 illustrates structures for the page table 135 and TLBs 140 and 142. In these tables, the low order bits of the binary representation of a virtual address are preserved and may be used as the low order bits of the physical address. The high order bits are treated as a key into one or more page tables. The page tables, in turn, include virtual address to physical address translation information. To this end, the page table 135 may include a plurality of page table entries 205, 225-250. Each of the illustrated page table entries 205, 225-250 may include information for translating a virtual address to a corresponding physical address 210. Entries may also include memory page size information 220 identifying the page size of the corresponding virtual address page and access permission information 215 for the corresponding virtual address page. Other information about the virtual address page such as whether the page has been written to by a process and/or when it was last used also may be included in each of the page table entries.

The translation lookaside buffer 140 is used to cache selected entries of the page table 135 that have a first memory page size. Each of the TLB entries, such as those shown at 270 and 273 may include a subset, additional information, or the same information as that found in the page table entries of page table 135. In FIG. 2, each of the entries of TLB 140 may include information for translating a virtual address to a corresponding physical address 255 and access permission information 260 identifying the access permissions for the corresponding virtual address page. As with the page table entries, other information relating to the address page such as whether the page has been written to by a process, when it was last used also may be included in each of the TLB entries.

The translation lookaside buffer 142 is used to cache selected entries of the page table 135 that have a second memory page size. Each of the TLB entries, such as those shown at 275 and 280 may include a subset, additional information, or the same information as that found in the page table entries of page table 135. In FIG. 2, each of the entries of TLB 142 may include information for translating a virtual address to a corresponding physical address 283 and access permission information 285 identifying the access permissions for the corresponding virtual address page. As with the page table entries, other information relating to the address page such as whether the page has been written to by a process, when it was last used also may be included in each of the TLB entries.

Each TLB 140 and 142 may have a limited number of TLB entries. The number entries may be substantially less than the number of page table entries in page table 135. The selection of the page table entries that are to be cached in the TLBs 140 may be determined by one or more caching processes. In addition to the memory page size of a given page table entry, such processes may rely on the relative locality of requested/accessed virtual memory locations, the frequency with which the virtual memory locations are accessed by various software applications, and/or other criteria. One or more such processes may be employed based on detailed system requirements, which may vary from system to system. To facilitate explanation, page table entry 205 is cached at TLB entry 270, page table entry 235 is cached at TLB entry 273, page table entry 240 is cached at TLB entry 275, and page table entry 245 is cached at TLB entry 280. Page table entries 205 and 235 have the same memory page size and, therefore, are stored in the same TLB 140. Page table entries 240 and 245 at the same memory page size and, therefore, are stored in the same TLB 142.

Figure 3:
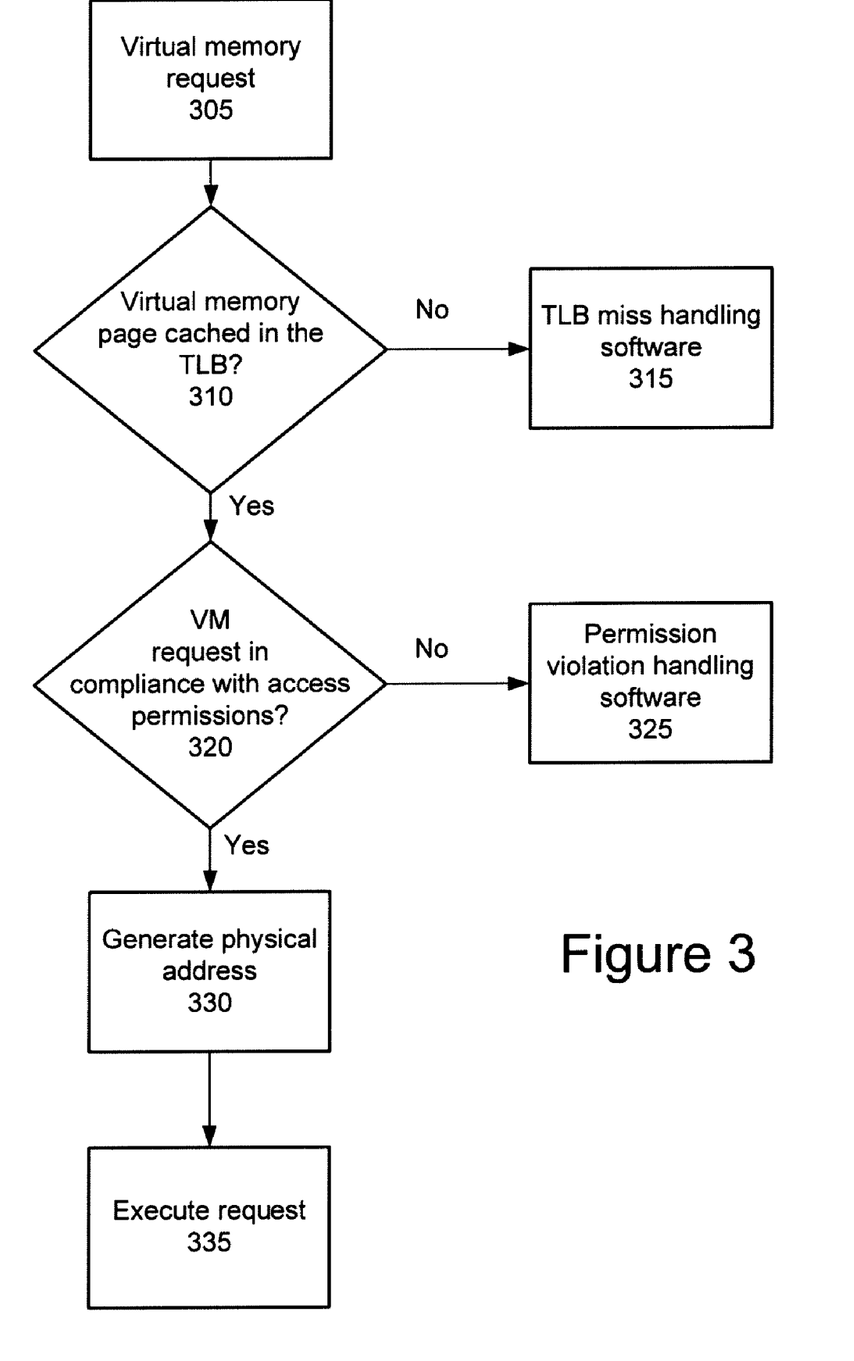
FIG. 3 shows operations that process a request associated with virtual memory.

FIG. 3 shows operations that may be used in processing a virtual memory request. A virtual memory request is executed at 305. At 310, the process determines whether the virtual memory page associated with the virtual memory request is cached in either of the TLBs 140 or 142. If it is not, the system 100 may execute one or more operations of TLB miss handling software at 315. However, if the virtual memory page associated with the virtual memory request is cached in either of the TLBs 140 or 142, the processing system 100 continues to process the request to determine whether the request complies with the access permissions associated with the virtual memory page. The system 100 may check the access permissions 260 of the corresponding TLB entry to make sure that the request does not violate the permissions for the virtual memory page. Such permissions may identify the corresponding virtual memory page as read-only, write-only, read/write, or another state. If the virtual memory request at 305 is invalid as determined at 320, the processing system 100 may execute one or more operations associated with permission violation handling software 325. Otherwise, the TLB in which the virtual memory page is cached uses the upper bits of the virtual memory to generate the upper portion of a physical address page. The lower bits of the virtual memory address may be used as an offset into the physical address page. These operations may be executed at 330. Execution of the virtual memory request using the corresponding physical address is executed at 335.

Figure 4:
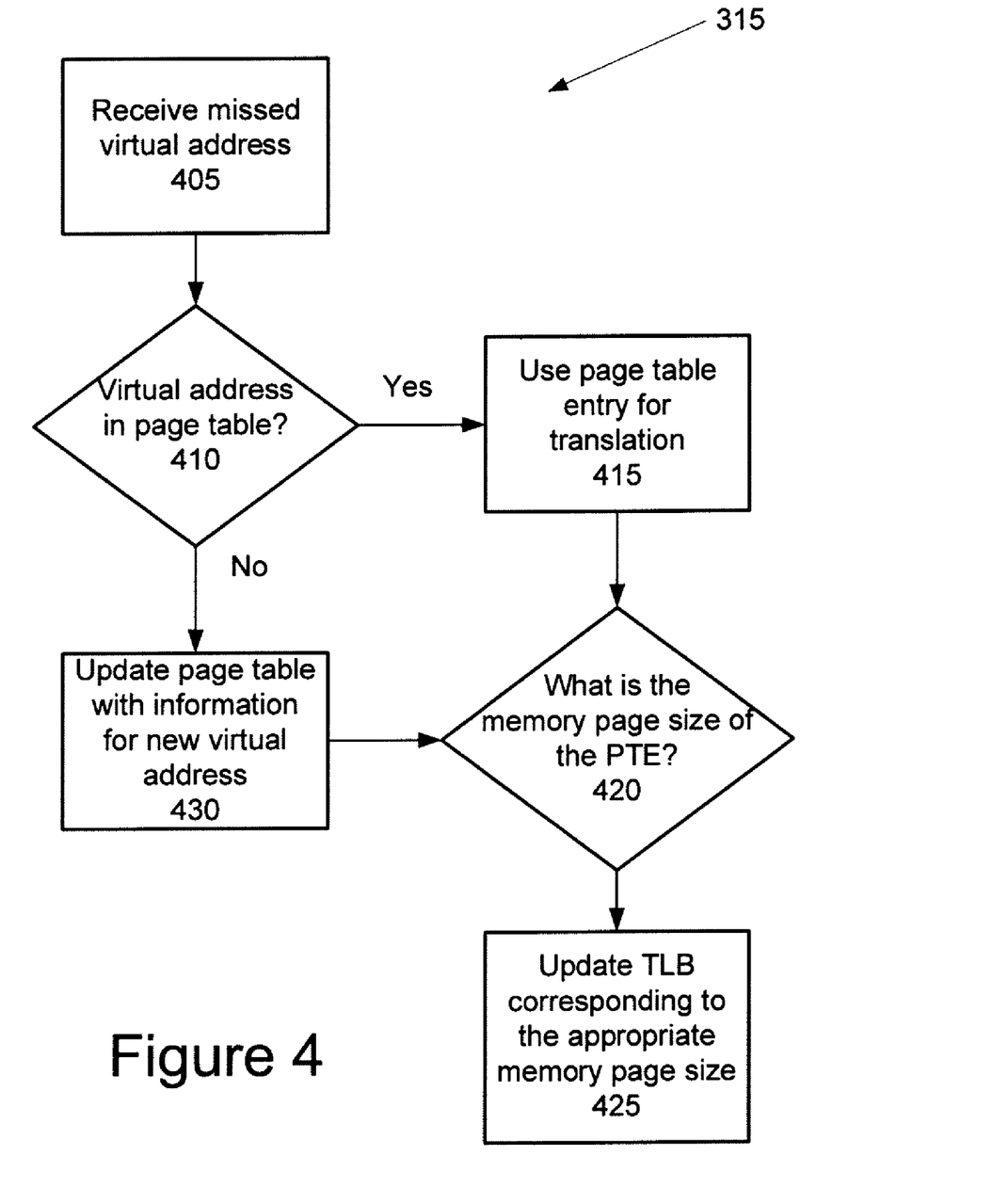
FIG. 4 shows operations that may be used to handle a translation lookaside buffer miss.

FIG. 4 shows operations that may be executed by the TLB miss handling software 315 shown in FIG. 3. At 405, the missed virtual address that was not found in either TLB is received. Although a single missed virtual address is discussed here for simplicity, the various TLB miss handling operations may also be applied to multiple missed virtual addresses. A page table walk operation or similar page table search occurs at 410 to determine whether the missed virtual address can be located in the page table. If the missed virtual address is found in the page table, the information in the corresponding page table entry is used for the physical address translation at 415. The size of the memory page of the page table entry is determined at 420. At 425, the memory page size is used to determine whether the information for the page table entry is used to update TLB 140 or TLB 142. For example, if the memory page size corresponds to the memory page size supported by TLB 140, then that TLB will be updated. If the memory page size corresponds to the memory page size supported by TLB 142, then that TLB will be updated. Updating operations may include adding new entries to a TLB and/or altering existing entries of a TLB.

If the missed virtual address is not found in the page table, a new page table entry may be generated at 430 and used to update the page table. The size of the memory page of the new page table entry is determined at 420. At 425, the memory page size is used to determine whether the information for the new page table entry is used to update TLB 140 or TLB 142.

Figure 5:
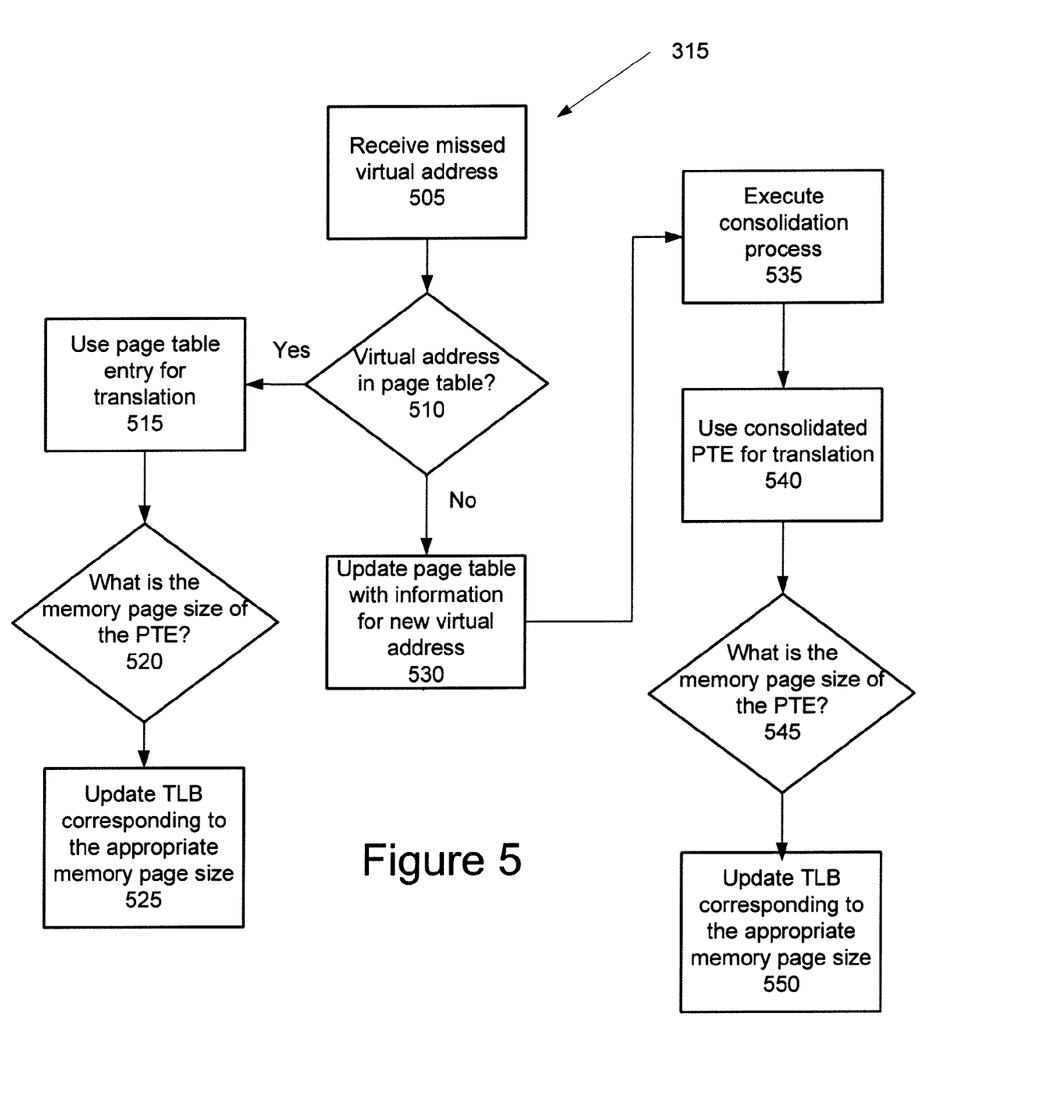
FIG. 5 shows further operations that may be used to handle a translation lookaside buffer miss.

FIG. 5 shows alternate operations that may be executed by the TLB miss handling software 315 shown in FIG. 3. At 505, the missed virtual address that was not found in either TLB is received. Although a single missed virtual address is discussed here for simplicity, the various TLB miss handling operations may also be applied to multiple missed virtual addresses. A page table walk operation or similar page table search occurs at 510 to determine whether the missed virtual address can be located in the page table. If the missed virtual address is found in the page table, the information in the corresponding page table entry is used for the physical address translation at 515. The size of the memory page of the page table entry is determined at 520. At 525, the memory page size is used to determine whether the information for the page table entry is used to update TLB 140 or TLB 142. Updating operations may include adding new entries to a TLB and/or altering existing entries of a TLB.

If the missed virtual address is not found in the page table, a new page table entry may be generated at 530 and used to update the page table. At 535, the processing system may execute a consolidation process. In the consolidation process, operations are executed to determine whether page table entries that are contiguous to and inclusive of the missed virtual address may be consolidated into one or more page table entries having a larger memory page size. The information corresponding to the consolidated page table entry is used at 540 to provide the physical address translation. The consolidation process executed at 535 may or may not result in a consolidation of the page table entries. In those instances in which no consolidation is performed, the original updated page table information for the new virtual address provided at 530 is used in the translation operation at 540. The size of the memory page of the new/consolidated page table entry is determined at 545. At 550, the memory page size is used to determine whether the information for the new page table entry is used to update TLB 140 or TLB 142.

Figure 6:
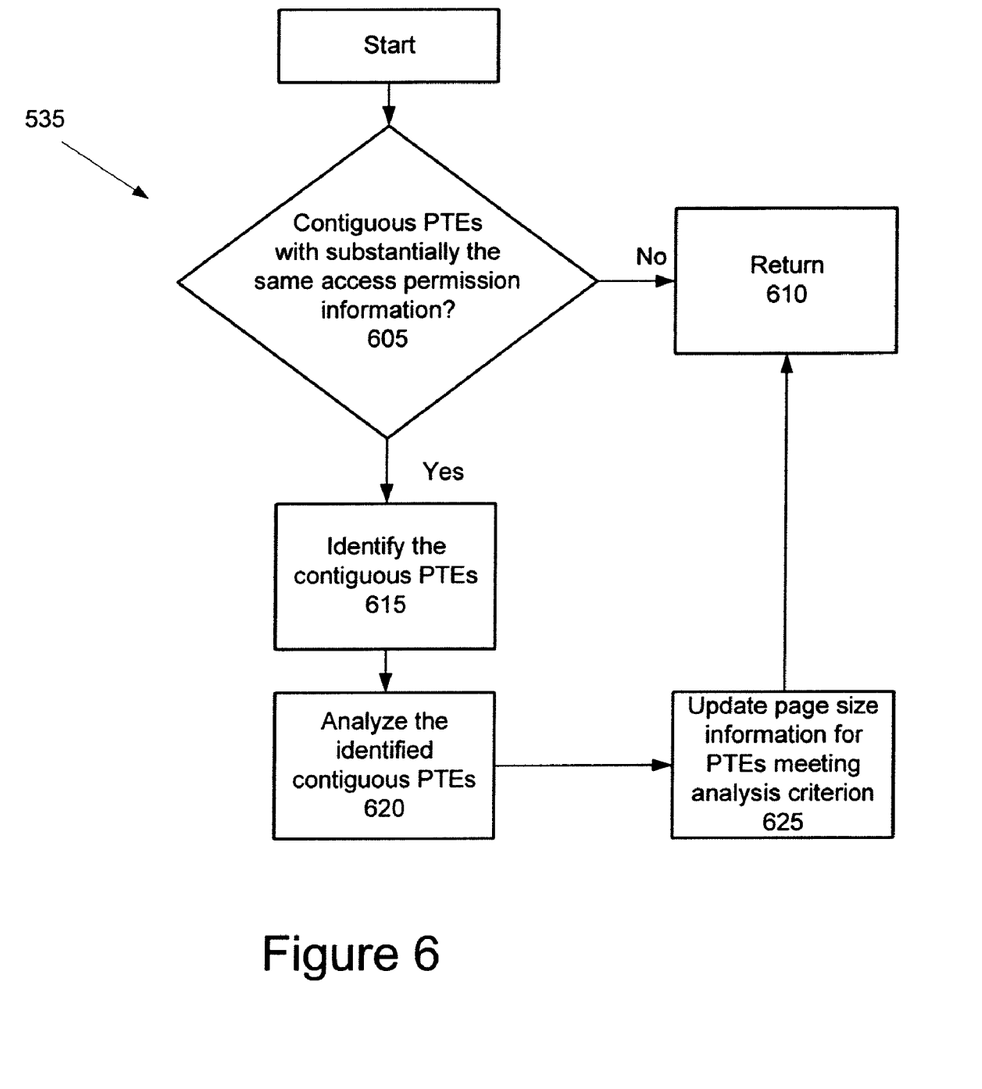
FIG. 6 shows operations that may be used in the consolidation process shown in FIG. 5.

FIG. 6 shows operations that may be associated with the consolidation process 535 of FIG. 5. At 605, the processing system 100 determines whether the new page table entry has resulted in a range of contiguous page table entries having common characteristics. Contiguous page table entries may be those that have both contiguous virtual addresses and contiguous physical addresses. The determination of FIG. 6 involves locating contiguous page table entries having substantially the same or identical access permission information. To increase the efficiency of this check, the operation at 605 may be limited to a check of page table entries within a certain locational distance of the new page table entry. If no such contiguous page table entries are found during the check at 605, the processing system 100 may continue execution of other operations at 610.

If contiguous page table entries having the requisite common characteristics are found, the contiguous page table entries are identified at 615 and analyzed at 620. The analysis at 620 may include an analysis of whether any of the contiguous page table entries may be consolidated into one or more page table entries having a larger page size than the page size of the original contiguous page table entries. The new, larger page size may be a multiple of the smallest page size used to organize the virtual memory space of the processing system 100. For example, if there are sixteen contiguous page table entries identified at 425 that have a page size of 4 kilobytes each, the page size for the contiguous page table entries may be updated to a larger virtual page size of 64 kilobytes. Similarly, if there are 256 contiguous page table entries identified at 425 that have a page size of 4 kilobytes each, the page size for the contiguous page table entries may be updated to a larger virtual page size of 1 megabyte.

Contiguous page table entries meeting the analysis criterion applied at 620 are updated at 625 with the new page size information. The updating operation applied at 625 may involve replacing each of the contiguous page table entries with the same information, including the new page size information. Alternatively, if permitted by the architecture of the page table, it may be possible to consolidate the contiguous page table entries into a single page table entry having the new page size information thereby releasing the memory associated with the remaining contiguous page table entries.

The number of contiguous page table entries identified at 615 of FIG. 6 that are consolidated to entries having a larger page size may vary. For example, it may be possible to consolidate all of the contiguous page table entries identified at 615. Alternatively, it may be possible to consolidate one or more subsets of the identified contiguous page table entries to corresponding page table entries of the same or different page sizes. Which of the contiguous page table entries identified at 615 are ultimately consolidated, if any, may depend on system design specifications and the specific analysis requirements applied to the identified entries at 620.

Figure 7:
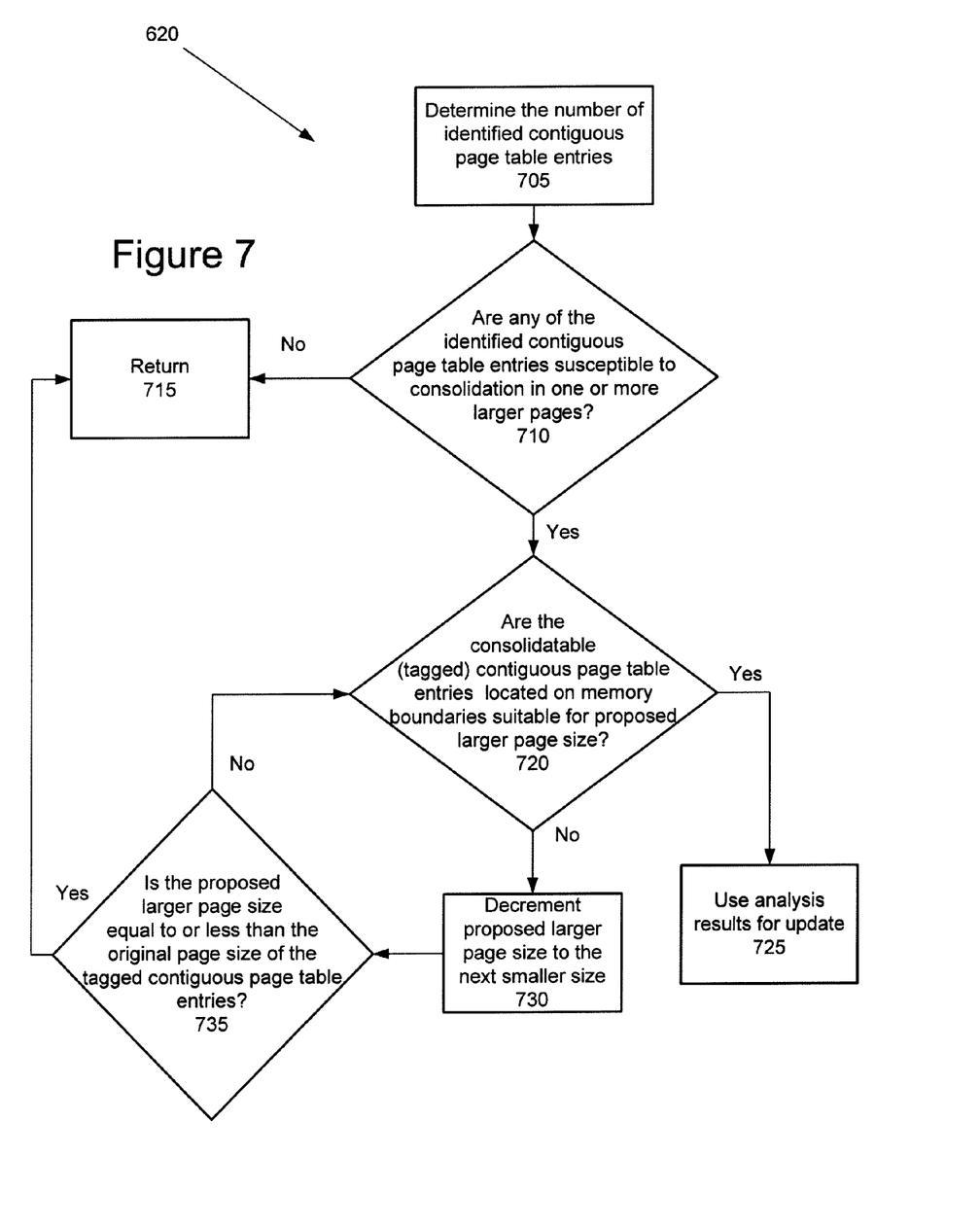
FIG. 7 shows operations that may be used during the analysis operation shown in FIG. 6.

FIG. 7 shows operations that may be executed by the processing system 100 during the analysis operation shown at 620 of FIG. 6. In FIG. 7, the operations are executed to determine whether any of the identified contiguous page table entries of 615 meet the criterion for consolidating them into one or more page table entries having a larger page size. The number of identified contiguous page table entries are determined at 705. At 710, a check is made to determine whether there are a sufficient number of contiguous page table entries in the identified range to consolidate into one or more page table entries having a larger page size. The number of contiguous page table entries that should exist in the decision operation at 710 before they are consolidated to a page table entry having a larger page size may vary from system to system. A decision on whether to consolidate the contiguous page table entries to a page table entry having a larger virtual page size may be based on whether the number of original contiguous page table entries are sufficient to form a page table entry having a new virtual page size that is supported by the system 100. Page sizes of 64 kilobytes, 128 kilobytes, 256 kilobytes, 512 kilobytes, and/or 1 megabyte are commonly used in many processing system architectures, although other page size values also may be employed. The page sizes used in the processing system 100 may be limited by the page sizes supported in the TLBs 140 and 142.

At operation 710, the process may consider whether the consolidation will result in wasted memory space. If the consolidation will result in an excess amount of memory space toward the end of a consolidated virtual page, a decision may be made at 710 to prevent consolidation or to consolidate the page table entries to a new page size. The new page size may be larger than the page size of the original contiguous page table entries but smaller than the largest page size value that could otherwise be used to consolidate the contiguous page table entries.

As a result of the operation shown at 710, an initial decision may be made on whether a consolidation will take place, which of the identified contiguous page table entries are susceptible of consolidation, and the proposed page size that will be used for the consolidation. If a decision is made at 710 to forgo consolidation of any of the identified contiguous page table entries, then the processing system 100 may continue execution of other processes at 715. However, if a decision is made at 710 to consolidate any of the identified contiguous page table entries, a further analysis may occur at 720. The analysis at 720 determines whether the contiguous page table entries susceptible of consolidation are located on page table boundaries suitable for use with the proposed larger page size value. For example, if a set of about 4 kilobytes/page contiguous page table entries are to be consolidated to a page table entry having a page size of about 64 kilobytes, the first page table entry of the set of contiguous page table entries should begin at a 64 kilobyte boundary of the memory space 110.

If the contiguous page table entries meet the memory boundary criterion of 720, then the contiguous page table entries that are to be consolidated and the proposed page size are passed to 540 of FIG. 5 at 725. Otherwise, the proposed page size may be decreased to the next smaller page size supported by system 100 at 730. At 735, the process determines whether the decreased page size is equal to or less than the original page size of the contiguous page table entries. If the smaller page size is equal to or less than the original page size, then there may be no need to consolidate the contiguous page table entries and the processing system 100 may continue execution of other processes at 715. However, if the decremented page size is greater than the original page size, the memory boundary check at 720 may be executed using the smaller page size. As shown, these operations may be repeated until the memory boundary check is met or the proposed page size is decreased so that it is equal to or less than the original page size of the contiguous page table entries that are tagged for consolidation.

Figure 8:
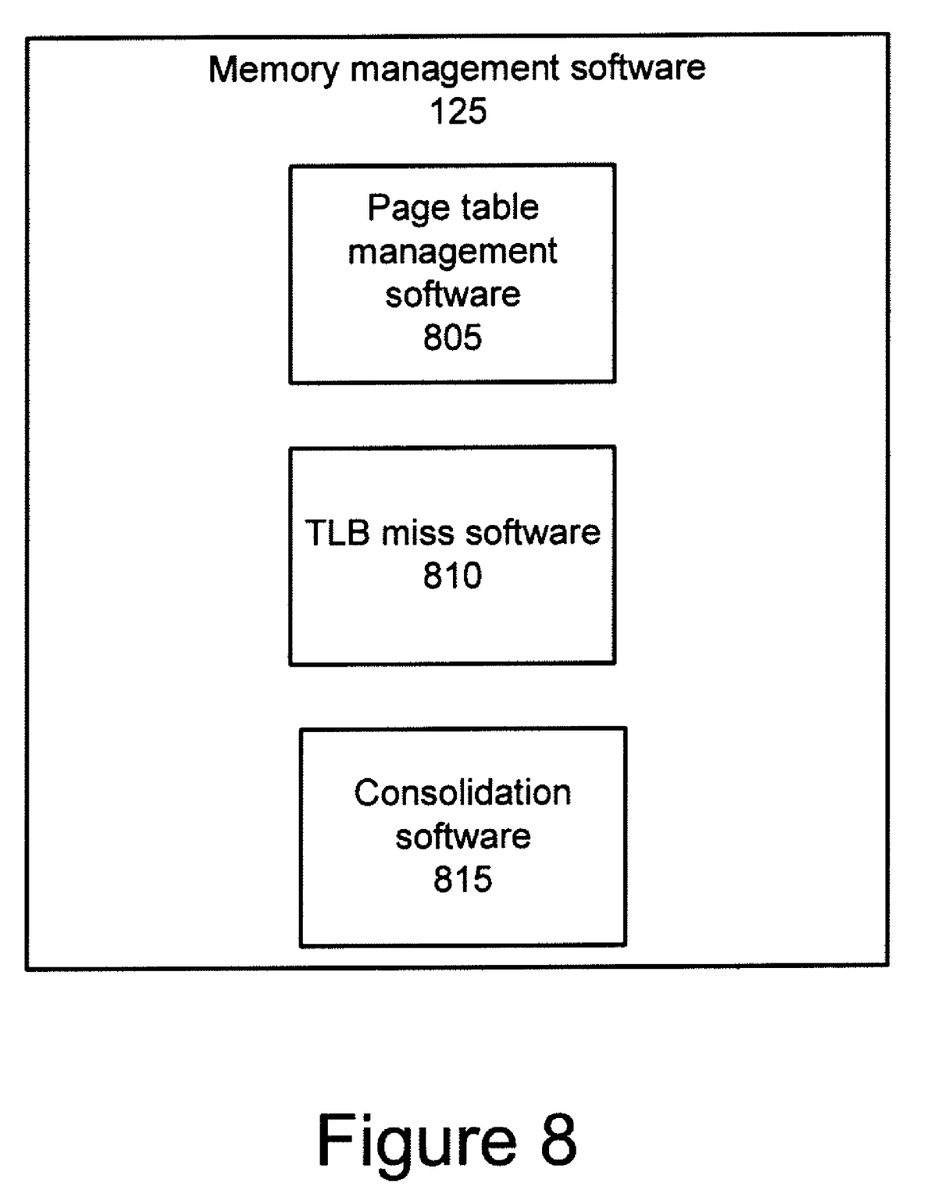
FIG. 8 is a block diagram of the memory management software shown in FIG. 1.

FIG. 8 is a block diagram illustrating one memory management software 125 architecture. The memory management software 125 may include page table management software 705 and TLB miss software 710. The page table management software may manage a page table, such as page table 135, having a plurality of page table entries. Each of the plurality of page table entries may include information for translating a virtual address to a corresponding physical address, memory page size information for a corresponding virtual address page, and access permission information for the corresponding virtual address page.

The translation lookaside buffer miss software handles translational lookaside buffer misses. In processing system 100, the TLB miss software 810 updates one or more entries of the first translation lookaside buffer 140 with information corresponding to at least one missed virtual address if the memory page size information for the missed virtual address meets a first criterion. The TLB miss software 810 updates one or more entries of the second translation lookaside buffer 142 with information corresponding to at least one missed virtual address if the memory page size information for the at least one missed virtual address meets a second criterion.

The memory management software 125 may also include consolidation software 815. The consolidation software 815 may be used to consolidate page table entries that are contiguous to and inclusive of the one or more missed virtual addresses into one or more page table entries having a larger memory page size. Such consolidation facilitates more effective use of the entries of the TLBs.

As shown in FIG. 1, the memory management software 125 may reside in a physical memory 110. The physical memory 110 may be a random access memory or similar storage medium that may be resident to or local to a processor through a bus. In some systems, the memory management software 125 may reside on other local or distributed storage media for use, storage, and or transfer of the software code. Such storage media may include, for example, a hard disk drive, a USB drive, flash memory, read only memory, optical storage media, or other storage media.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for managing memory of a processing system comprising at least one processor, the method comprising:
   detecting, through the use of the at least one processor, a translation lookaside buffer miss;
   identifying, through the use of the at least one processor, one or more missed virtual addresses corresponding to the translation lookaside buffer miss;
   updating, through the use of the at least one processor, a first translation lookaside buffer with information corresponding to the one or more missed virtual addresses only if memory page size information for the one or more missed virtual addresses corresponds to a first memory page size supported by the first translation lookaside buffer; and
   updating, through the use of the at least one processor, a second translation lookaside buffer with information corresponding to the one or more missed virtual addresses only if memory page size information for the one or more missed virtual addresses corresponds to a second memory page size supported by the second translation lookaside buffer, where the second memory page size is different than the first memory page size.

2. The method of claim 1, where the second memory page size supported by the second translation lookaside buffer is larger than the first memory page size supported by the first translation lookaside buffer.

3. The method of claim 1, further comprising consolidating page table entries that are contiguous to and inclusive of the one or more missed virtual addresses into one or more page table entries having a larger memory page size.

4. The method of claim 3, further comprising using the consolidated page table entries to update either of the first or second translation lookaside buffer based on a value of the larger memory page size.

5. A processor comprising a physical memory having a software code embodied therein, the software code adapted to be executed to implement a method for managing memory of a processing system, the method comprising:
- detecting a translation lookaside buffer miss;
- identifying one or more missed virtual addresses corresponding to the translation lookaside buffer miss;
- updating a first translation lookaside buffer with information corresponding to the one or more missed virtual addresses only if memory page size information for the one or more missed virtual addresses corresponds to a first memory page size supported by the first translation lookaside buffer; and
- updating a second translation lookaside buffer with information corresponding to the one or more missed virtual addresses only if memory page size information for the one or more missed virtual addresses corresponds to a second memory page size supported by the second translation lookaside buffer, where the second memory page size is different than the first memory page size.

6. The storage medium of claim 5, where the second memory page size supported by the second translation lookaside buffer is larger than the first memory page size supported by the first translation lookaside buffer.

7. The storage medium of claim 5, further comprising consolidating page table entries that are contiguous to and inclusive of the one or more missed virtual addresses into one or more page table entries having a larger memory page size.

8. The storage medium of claim 7, further comprising using the consolidated page table entries to update either of the first or second translation lookaside buffer based on a value of the larger memory page size.

9. A processing system comprising:
- a physical memory comprising a page table and memory management software, where the page table includes a plurality of page table entries, where each of the plurality of page table entries includes memory page size information for a corresponding virtual address page;
- a hardware module comprising a first translation lookaside buffer and a second translation lookaside buffer, where the first translation lookaside buffer is adapted to cache information for only page table entries having a first memory page size;
- where the second translation lookaside buffer is adapted to cache information for only page table entries having a second memory page size, where the second memory page size differs from the first memory page size; and
- where the memory management software is responsive to a translation lookaside buffer miss to update translation lookaside buffer information based on one or more missed virtual addresses, where the memory management software updates one or more entries of the first translation lookaside buffer with information corresponding to the one or more missed virtual addresses only if memory page size information for the one or more missed virtual addresses corresponds to the first memory page size, and where the memory management software updates one or more entries of the second translation lookaside buffer with information corresponding to the one or more missed virtual addresses only if the memory page size information for the one or more missed virtual address corresponds to the second memory page size.

10. The processing system of claim 9, where the second memory page size is larger than the first memory page size.

11. The processing system of claim 9, where the memory management software is further responsive to a translation lookaside buffer miss to consolidate page table entries that are contiguous to and inclusive of the one or more missed virtual addresses into one or more page table entries having a larger memory page size.

12. The processing system of claim 11, where the memory management software updates either the first or the second translation lookaside buffer using information from the consolidated page table entries.

13. The processing system of claim 11, where the larger memory page size corresponds to a largest memory page size to which the consolidated page table entries may be mapped.

14. The processing system of claim 9, where the memory management software directly updates the one or more corresponding entries of the first and second translation lookaside buffers.

15. The processing system of claim 9, where the memory management software indirectly updates the one or more corresponding entries of the first and second translation lookaside buffers through one or more further software modules.

16. The processing system of claim 9, where the processing system comprises a single page table.

17. The processing system of claim 9, where the processing system comprises multiple page tables.

\* \* \* \* \*